(12) United States Patent
Hsiao et al.

(10) Patent No.: US 9,791,736 B2
(45) Date of Patent: Oct. 17, 2017

(54) BACKLIGHT MODULE

(71) Applicant: Shenzhen China Star Optoelectronics Technology Co., Ltd., Shenzhen, Guangdong (CN)

(72) Inventors: Yuchun Hsiao, Guangdong (CN); Qinjun Shi, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 526 days.

(21) Appl. No.: 14/396,765

(22) PCT Filed: Sep. 12, 2014

(86) PCT No.: PCT/CN2014/086442
§ 371 (c)(1),
(2) Date: Oct. 24, 2014

(87) PCT Pub. No.: WO2016/037366
PCT Pub. Date: Mar. 17, 2016

(65) Prior Publication Data
US 2016/0077379 A1    Mar. 17, 2016

(30) Foreign Application Priority Data

Sep. 9, 2014   (CN) .......................... 2014 1 0456335

(51) Int. Cl.
*G09F 13/04*    (2006.01)
*G02F 1/1335*   (2006.01)

(52) U.S. Cl.
CPC .............................. *G02F 1/133608* (2013.01)

(58) Field of Classification Search
CPC ................................................ G02F 1/133608
USPC ........................................................ 362/97.3
See application file for complete search history.

(56) References Cited

U.S. PATENT DOCUMENTS

| | | | | |
|---|---|---|---|---|
| 1,908,203 A | * | 5/1933 | Wilfred ................... | A63J 5/021 353/62 |
| 2,617,328 A | * | 11/1952 | Stableford ............. | G03B 21/10 312/329 |
| 2,834,874 A | * | 5/1958 | Henchoz ............. | F21S 48/1721 362/279 |
| 5,434,631 A | * | 7/1995 | Lieberman ............. | G03B 21/10 353/119 |
| 5,949,576 A | * | 9/1999 | Wilson ................... | G03B 21/02 348/E5.144 |
| 6,219,183 B1 | * | 4/2001 | Doany ................... | G03B 21/10 353/75 |
| 6,995,906 B2 | * | 2/2006 | Edney ................... | G03B 21/16 312/10.1 |

(Continued)

*Primary Examiner* — Bryon T Gyllstrom
(74) *Attorney, Agent, or Firm* — Andrew C. Cheng

(57) ABSTRACT

The invention provides a backlight module, comprising: a light source module used for emitting light; a light box module used for reflecting light emitted from the light source module, and the light box module includes two openings and a size of a second opening is bigger than a first opening, and the light source module is disposed at the first opening; a display panel component is disposed at the second opening and applied in displaying images; a film assembly disposed in the light box module, can be moved within a depth direction between the light source module and the display panel component.

15 Claims, 3 Drawing Sheets

(56) References Cited

U.S. PATENT DOCUMENTS

| | | | | |
|---|---|---|---|---|
| 8,061,848 B1* | 11/2011 | Frank | ............ | G03B 21/001 |
| | | | | 353/35 |
| 2004/0041986 A1* | 3/2004 | Tawil | ............ | G03B 21/001 |
| | | | | 353/88 |
| 2006/0017887 A1* | 1/2006 | Jacobson | ............ | G03B 21/10 |
| | | | | 353/30 |
| 2007/0024821 A1* | 2/2007 | Devos | ............ | G02B 17/08 |
| | | | | 353/74 |
| 2007/0279907 A1* | 12/2007 | Goto | ............ | B60Q 1/085 |
| | | | | 362/277 |
| 2010/0128473 A1* | 5/2010 | Parra | ............ | F21V 14/02 |
| | | | | 362/235 |

\* cited by examiner

BACKLIGHT MODULE

BACKGROUND OF THE INVENTION

1. Field of the Invention

The invention relates to display field, especially to a backlight module applied mainly to liquid crystal display panel.

2. Description of Related Art

Mura (light shadow) means a phenomenon of various imprints caused by uneven brightness of a display. Its occurrence mainly due to color variances visually caused by different frequencies influenced from sensing different light sources, and this turns into bad efficient situation at a certain angel.

Structures of direct liquid crystal modules on market are uniform. When viewing in a certain angel is in need but with Mura occurred accidentally, structures of common direct light box have its restrictions and audience cannot be satisfied with.

SUMMARY

Due to defects of present existing technology, the invention provides a backlight module to solve the problems of Mura which is hard to overcome, and decrease effects in observing efficiencies.

To approach the aforementioned purpose, the invention applied technologies listed as following:

A backlight module, comprising:
a light source module, can be used for emitting light;
a light box module, used for reflecting light emitted from the light source module, and the light box module have two openings and a size of a second opening is larger than a first opening, and the light source module is disposed at the first opening;
a display panel component, disposed at the second opening and used for display images;
a film assembly, disposed in the light box module, can be moved within a depth direction between the light source module and the display panel component.

Wherein the light box module is surrounded by four trapezoid planes and at least one side of the film assembly includes turn-ups, which connect to an inner wall of the light box module.

Wherein the film assembly includes turn-ups at the opposite two sides.

Wherein a rectangle frame can be disposed at the second opening of the light box module, and the film assembly connects flexibly to the rectangle frame and is movable within the rectangle frame.

Wherein at least one side wall of the rectangle frame includes an adjusting component with a plurality of long holes, and furthermore, the adjusting component includes a film fixing structure disposed in the lone holes, and the film fixing structure includes a film connector, a main body and a light box connector connected sequentially; the film connector connects to the film assembly, and the light box connector can be disposed and slid in the long holes.

Wherein the film connector can be a claw and the film assembly corresponds to a side with through holes of the film connector.

Wherein a shoulder is formed at a connecting portion of the main body and the light box connector, and a plurality of limiting grooves disposed along the length direction of the long holes on the adjusting component, the limiting grooves are connect through the long holes, and the light box connector is disposed within the limiting grooves.

Wherein the light source module includes a LED module and a bearing frame, and the LED module is fixed within the bearing frame, and the bearing frame is disposed at the first opening.

Wherein a fragment is disposed on a bottom of the display panel component, and the fragment tilts upward and connects flexibly to the film assembly on the bottom when the film assembly approaches to the display panel component.

Wherein the display panel component includes a module front frame, a display panel and a glue frame.

This invention provides a structure movable in the depth direction of the film assembly to approach structure diversification in design, to solve problems caused by Mura when watching crystal module from different angles, and to decrease effects caused from watching efficiency of light shadow.

DETAILED DESCRIPTION OF THE EMBODIMENTS

In order to make the present invention more understandable and complete, references are made to detailed descriptions set forth hereinafter in conjunction with figures.

Embodiment 1

Figure 1:
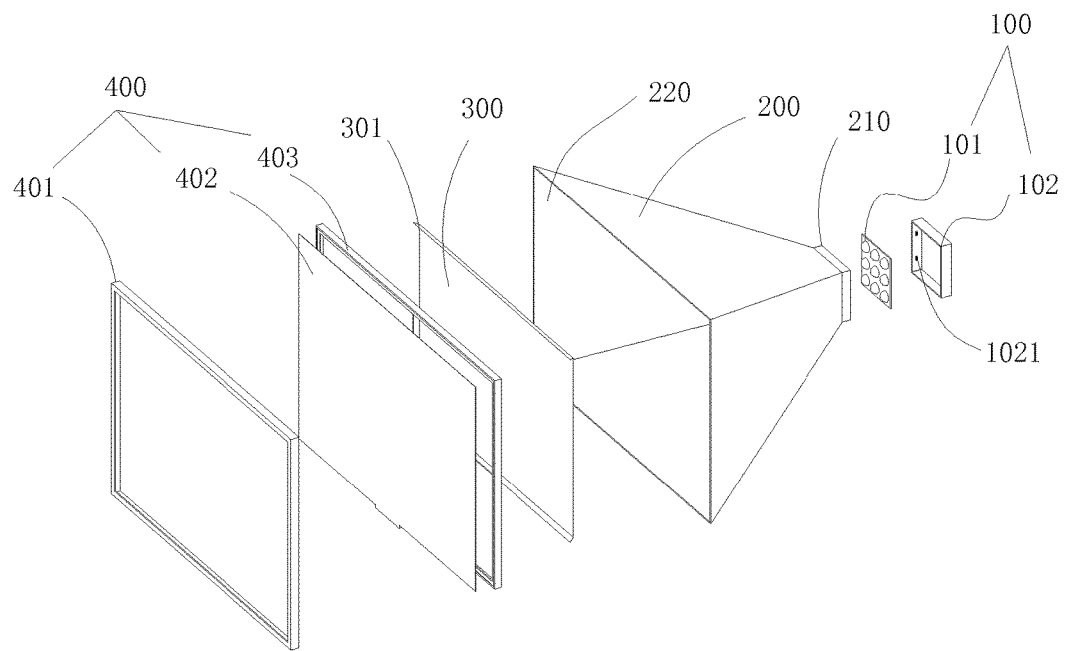
FIG. 1 shows a structural explosive view of embodiment 1 of a backlight module of the invention.

Please refer to FIG. 1, which shows explosive structural view of backlight module in embodiment 1 of the invention, and backlight module sequentially comprises a light source module 100, a light box module 200, a film assembly 300 and a display panel component 400.

Wherein the light source module 100 can be used for emitting light; the light box module 200 can be used for reflecting light emitted from the light source module 100; the light box module 200 includes two openings, and a size of a second opening 220 is larger than a first opening 210; the light source module 100 is disposed at the first opening 210. The display panel component 400 disposed at the second opening 220 includes a module front frame 401, a display panel 402 and a glue frame 403, and can be applied in displaying images; the film assembly 300 is disposed in the light box module 200, and can be movable within a depth direction between the light source module 100 and the display panel component 400.

Concretely, the light box module 200 plating a reflective layer or apply a reflective film on the inner wall.

The problem of Mura caused by light source in certain condition which is the light box module 200 with uni-depth can be solved by disposing the film assembly 300 movable within the depth of the light box module 200, which makes the depth of the light box module 200 adjustable effectively in operation.

The light box module 200 is surrounded by four trapezoid planes, and, and the film assembly 300 includes at least one turn-up 301, and the turn-up 301 connects to an inner wall of the light box module 200. In this embodiment, the light box module 200 is surrounded by four isosceles trapezium planes, and the film assembly 300 is formed by a plurality of optical films in pile; when adjusting the depth of a light box 200, move the film assembly 300 along the depth direction of the light box module 200, and the turn-up 301 keeps connecting to the light box module 200 during the moving procedure; the aforementioned process guarantees accuracy in moving. In this embodiment, the film assembly 300 includes 2 turn-ups 301, and the turn-ups 301 incline correspond to the film assembly 300 simultaneously; in other embodiments, turn-ups 301 and an inclined angel of the inner wall of the light box module 200 can be the same by disposing the inclined angle and direction of the turn-ups 301.

Figure 2:
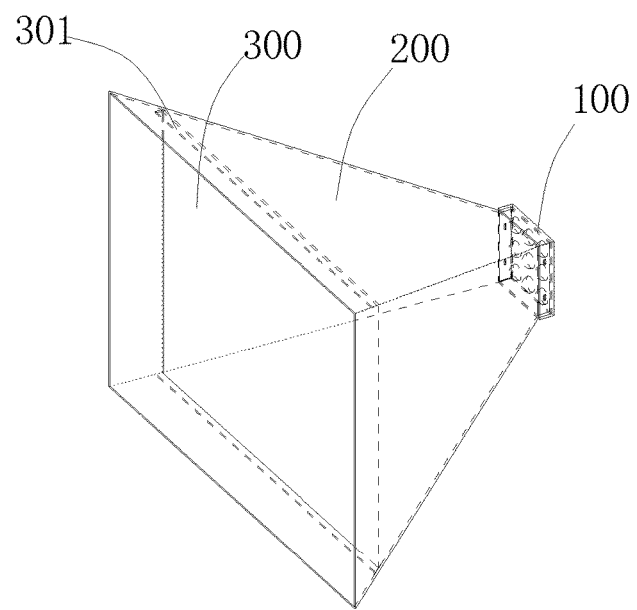
FIG. 2 is a perspective view of embodiment 1 of the invention presenting a situation of the inner extreme position when the film assembly disposed into the light box module.

Due to a limited flexibility of the film assembly 300, there are two restricted positions of the film assembly 300 in moving: a first restricted position is close to the second opening 220 of the light box module 200, and a second restricted position is away from the second opening 220. FIG. 2 shows a sectional view of the film assembly 300 disposed at the inmost second position of the light box module. Correspondingly, the turn-ups 301 have the minimum elastic compression at the first restricted position, but the light box module 200 has the maximum effective depth; the turn-ups 301 have the maximum elastic compression at the second restricted position, but the light box module 200 has the minimum effective depth.

Figure 3:
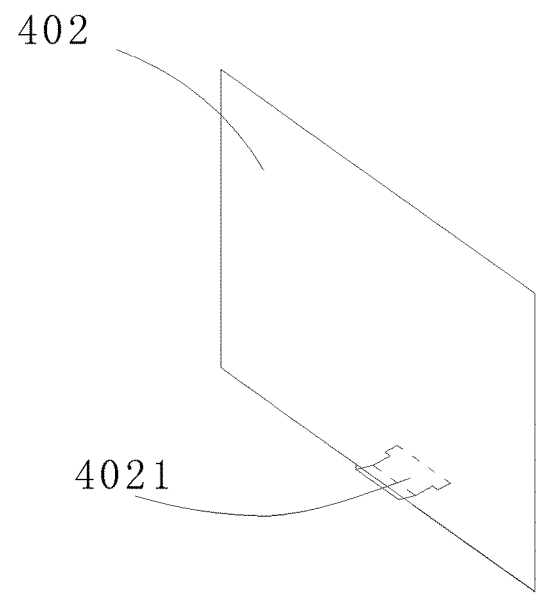
FIG. 3 shows a structural perspective view of embodiment 1 of a backlight module of the invention.

Furthermore, please refer to FIG. 3, a fragment 4021 is disposed on a bottom of the display panel component 400, and the fragment 4021 tilts upward and connects flexibly to the film assembly 300 on the bottom when the film assembly 300 approaches to the display panel component 400. Wherein, the fragment 4021 can be disposed on the display panel 402, and a corresponded through hole (not shown in figures) can be disposed at a bottom of the glue frame 403. Moreover, after disposing the display panel component 400 on the light box module 200, a length of the fragment 4021 is between the first restricted position and the second restricted position. When moving the film assembly 300 from the second restricted position to the first restricted position, the elasticity between the turn-ups 301 and the light box module 200 is getting weak; after moving the film assembly 300 upon to the fragment 4021, the film assembly 300 connects to the fragment 4021 due to the existence of the fragment 4021, which even more guarantees reliable positioning for the film assembly 300. It is understandable that the fragment 4021 can also be disposed on the module front frame 401 or the glue frame 403.

In addition, the light source module 100 includes a LED module 101 and a bearing frame 102, and the LED module 101 is formed by a multiple LED array on a circuit board, and the LED module 101 is fixed within the bearing frame 102, and the bearing frame 102 is disposed at the first opening 210. Furthermore, side walls of the bearing frame 102 can be disposed a plurality of stopper 1021, which can limit a position of the LED module 101 to prevent derailing. LED module 101 can be disposed upon the light box module 200 by being fixed on the bearing frame 102, and the LED module 101 can be assembled and disassembled individually; when the light source module 100 breakdown or film need to be replaced after assembling the backlight module, it is even more convenient to repair without disassembling parts, and avoiding damage other parts when reassembling.

Embodiment 2

Figure 4:
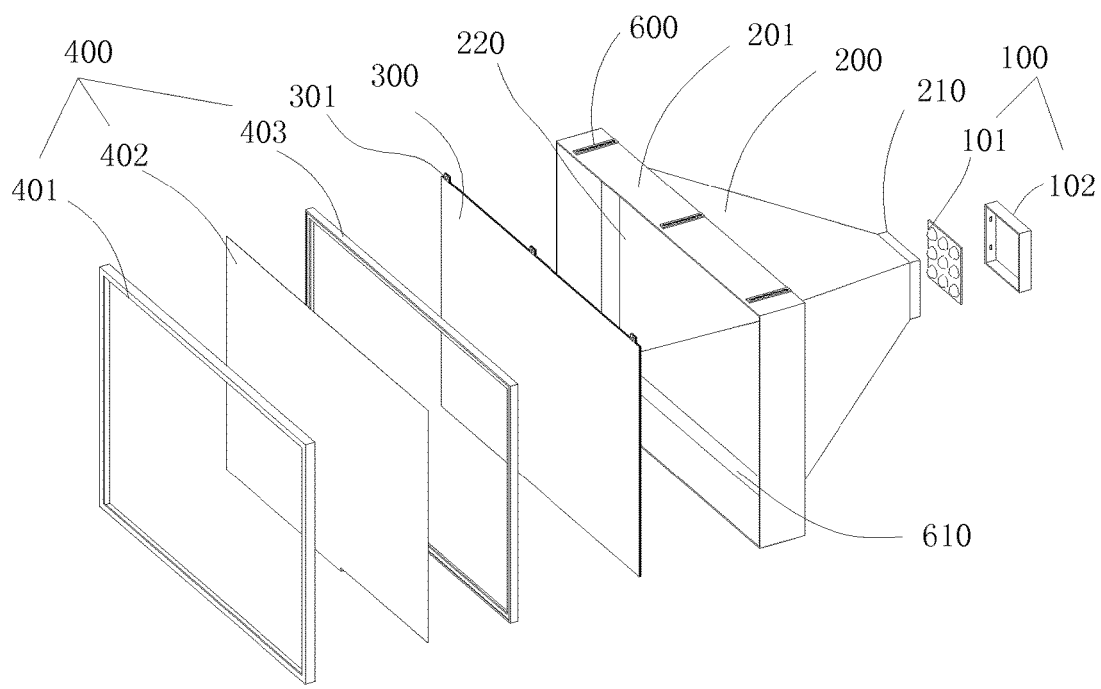
FIG. 4 is a structural explosive view of embodiment 2 of a backlight module of the invention.

Please refer to FIG. 4, the invention represents an explosive view for a backlight module of embodiment 2. The difference from embodiment 1 is that a rectangle frame 201 can be disposed at the second opening 220 of the light box module 200, and the film assembly 300 connects flexibly to the rectangle frame 201 and is movable within the rectangle frame 201.

In the light box module 200, trapezoid planes surround a frame body connected to the rectangle frame 201; a step area 610 is formed by connecting the rectangle frame 201 and an extension out from a frame body opening of the surrounding trapezoid planes; the step area 610 corresponds to the second restricted position for the film assembly 300 when moving.

In other embodiments, the frame body surrounded by the trapezoid planes and the rectangle frame 201 can be integrated molding, and the step area 610 can be waived because the rectangle frame 201 can be extended from the surrounding of the trapezoid planes; the bottom of the rectangle frame 201 corresponds to the second restricted position for the film assembly 300 when moving. Or, a plate (not shown in figures) can be formed at the connecting part of the trapezoid planes' surrounding frame body and the rectangle frame 201 to limit the film assembly 300 further moving.

Figure 5:
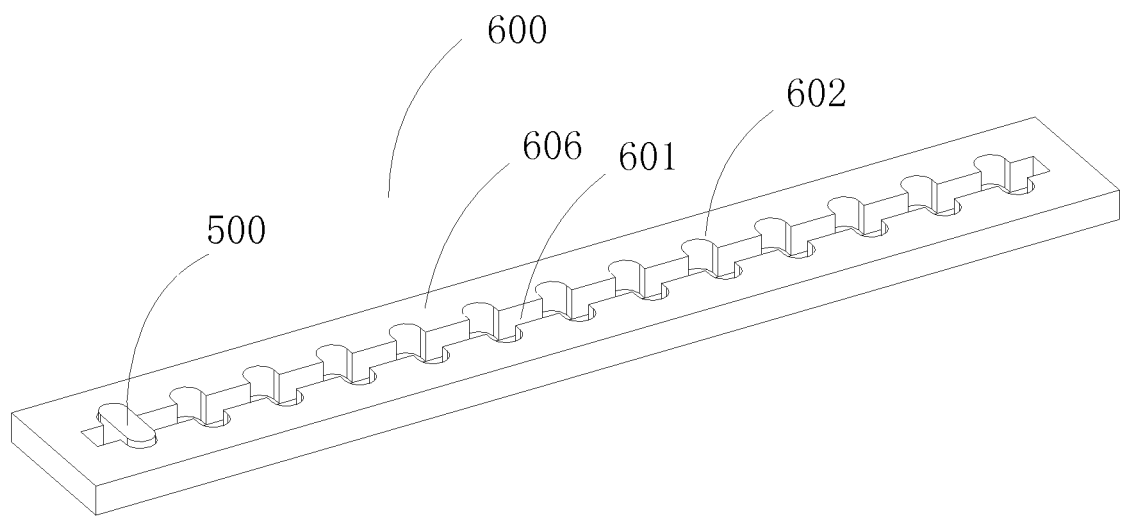
FIG. 5 is an operating perspective view of an adjusting component of a backlight module of embodiment 2 of the invention.
Figure 6:
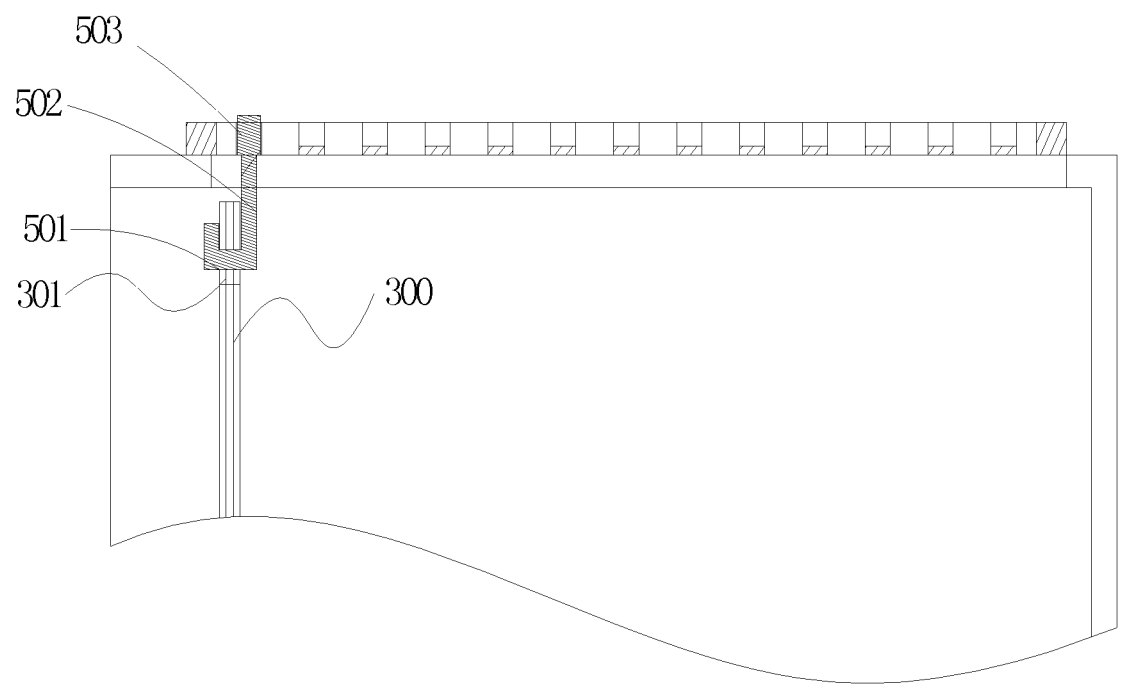
FIG. 6 shows an operating cross-sectional side view of a adjusting component of backlight module of embodiment 2 of the invention.

Refer to FIG. 5 and FIG. 6 simultaneously, in this embodiment, at least one side wall of the rectangle frame 201 includes an adjusting component 600 with a plurality of long holes 601; furthermore, the adjusting component 600 even includes a film fixing structure 500 disposed in the lone holes 601, and the film fixing structure 500 includes a film connector 501, a main body 502 and a light box connector 503 connected sequentially; the film connector 501 connects to the film assembly 300, and the light box connector 503 can be disposed and slid in the long holes 601.

Wherein the film connector 501 can be a claw and the film assembly 300 corresponds to a side with through holes 301 of the film connector 501. In this embodiment, the film fixing structure 500 apply elastic materials, ex: rubber, silica gel, and etc. in manufacturing.

The light box connector 503 and the main body 502 can be integrated molding, and can be assembled partially, ex: takes the light box connector 503 as a nut to connect to thread on the main body 502.

Furthermore, a shoulder is formed at a connecting portion of the main body 502 and the light box connector 503; with a plurality of limiting grooves 602 disposed along the length direction of the long holes 601 on the adjusting component 600, the limiting grooves 602 connect through the long holes 601, and the light box connector 503 is disposed within the limiting grooves 602.

Moreover, in this embodiment, the adjusting component 600 comprises a fixing board 606 disposed individually which mainly connects to the side wall of the rectangle frame 201, with the long holes 601 and the limiting grooves 602 disposed upon the fixing board; a long through hole (not shown in figures) can be disposed on the corresponding side wall of the rectangle frame 201 at the same time, and the fixing board can be fixed at the long through hole. In other embodiments, the long holes 601 and the limiting grooves 602 can be disposed directly on the side wall of the rectangle frame 201.

A plurality of long holes 601 in this embodiment can be arranged in parallel, and a plurality of limiting grooves can be disposed evenly in the long holes 601. Concretely, a single limiting groove 602 and the long holes 601 can be disposed vertically, and a T-typed structure is formed at the connecting portion of the main body 502 and the light box connector 503. The main body 502 of the film fixing structure 500 can be slid in the long holes 601, and the light box connector 503 can be optionally connected to the plurality of limiting grooves 602 which connect through the long holes to approach adjusting and choosing position in the film assembly 300.

In practical operation, when need to adjusting the effective depth of the light box module 200, pull out the light box connector 503 from one of the limiting grooves 602 first, and then move the film assembly 300 along the long holes 601 in the light box module 200; after adjusting to a right depth, push the light box connector 503 to the corresponding limiting grooves then.

Furthermore, for operating conveniently, the film fixing structures 500 at the same side can be fixed on the same limiting bar (not shown in figures); and while adjusting the depth of the light box, only pull up the limiting bar, and a plurality of film fixing structures 500 can be adjusted simultaneously, and make adjusting even more convenient.

It should be understood that the embodiments disclosed herein shall be considered in a descriptive sense only and not for purposes of limitation. Descriptions of features, advantages, or aspects of each embodiment should be considered as available for other similar features or aspects in other embodiments.

What is claimed is:

1. A backlight module, comprising:
    a light source module, used for emitting light;
        a light box module, used for reflecting light emitted from the light source module, and the light box module includes two openings, and a size of a second opening is larger than a first opening, and the light source module is disposed at the first opening;
        a display panel component, disposed at the second opening and applied in displaying images;
        a film assembly, disposed in the light box module and movable within a depth direction between the light source module and the display panel component;
        wherein a rectangle frame is disposed at the second opening of the light box module, and the film assembly connects flexibly to the rectangle frame and is movable within the rectangle frame; and
        at least one side wall of the rectangle frame includes an adjusting component with a plurality of long holes, and furthermore, the adjusting component includes a film fixing structure disposed in the lone holes, and the film fixing structure includes a film connector, a main body and a light box connector connected sequentially, and the film connector connects to the film assembly, and the light box connector is disposed and slid in the long holes.

2. The backlight module according to the claim 1, wherein the light box module is surrounded by four trapezoid planes, and at least one side of the film assembly includes turn-ups, and the turn-ups connect to a inner wall of the light box module.

3. The backlight module according to the claim 2, wherein the film assembly includes turn-ups at the opposite two sides.

4. The backlight module according to the claim 2, wherein the light source module includes an LED module and a bearing frame, and the LED module is fixed within the bearing frame, and the bearing frame is disposed at the first opening.

5. The backlight module according to the claim 4, wherein a fragment is disposed on a bottom of the display panel component, and the fragment tilts upward and connects flexibly to the film assembly on the bottom when the film assembly approaches to the display panel component.

6. The backlight module according to the claim 1, wherein the film connector is a claw, and the film assembly corresponds to a side wall with through holes of the film connector.

7. The backlight module according to the claim 6, wherein the light source module includes an LED module and a bearing frame, and the LED module is fixed within the bearing frame, and the bearing frame is disposed at the first opening.

8. The backlight module according to the claim 7, wherein a fragment is disposed on a bottom of the display panel component, and the fragment tilts upward and connects flexibly to the film assembly on the bottom when the film assembly approaches to the display panel component.

9. The backlight module according to the claim 1, wherein a shoulder is formed at a connecting portion of the main body and the light box connector, and a plurality of limiting grooves is disposed along the length direction of the long holes on the adjusting component, and the limiting grooves connect through the long holes, and the light box connector is disposed within the limiting grooves.

10. The backlight module according to the claim 9, wherein the light source module includes an LED module and a bearing frame, and the LED module is fixed within the bearing frame, and the bearing frame is disposed at the first opening.

11. The backlight module according to the claim 10, wherein a fragment is disposed on a bottom of the display panel component, and the fragment tilts upward and connects flexibly to the film assembly on the bottom when the film assembly approaches to the display panel component.

12. The backlight module according to the claim 1, wherein the light source module includes an LED module and a bearing frame, and the LED module is fixed within the bearing frame, and the bearing frame is disposed at the first opening.

13. The backlight module according to the claim 12, wherein a fragment is disposed on a bottom of the display panel component, and the fragment tilts upward and connects flexibly to the film assembly on the bottom when the film assembly approaches to the display panel component.

14. A backlight module, comprising:
    a light source module, used for emitting light;
        a light box module, used for reflecting light emitted from the light source module, and the light box module includes two openings, and a size of a second opening is larger than a first opening, and the light source module is disposed at the first opening;
        a display panel component, disposed at the second opening and applied in displaying images;
        a film assembly, disposed in the light box module and movable within a depth direction between the light source module and the display panel component;

wherein the light source module includes an LED module and a bearing frame, and the LED module is fixed within the bearing frame, and the bearing frame is disposed at the first opening; and wherein a fragment is disposed on a bottom of the display panel component, and the fragment tilts upward and connects flexibly to the film assembly on the bottom when the film assembly approaches to the display panel component.

15. The backlight module according to the claim 14, wherein the display panel component includes a module front frame, a display panel and a glue frame.

* * * * *